US008250066B2

(12) United States Patent  
Miedema (10) Patent No.: US 8,250,066 B2  
(45) Date of Patent: Aug. 21, 2012

(54) SEARCH RESULTS RANKING METHOD AND SYSTEM

(75) Inventor: John Edward Miedema, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 12/204,008

(22) Filed: Sep. 4, 2008

(65) Prior Publication Data

US 2010/0057714 A1 Mar. 4, 2010

(51) Int. Cl.  
*G06F 7/00* (2006.01)  
*G06F 17/30* (2006.01)

(52) U.S. Cl. .......................... 707/723; 707/748
(58) Field of Classification Search ............ 707/723, 707/748  
See application file for complete search history.

(56) References Cited

U.S. PATENT DOCUMENTS

| | | | |
|---|---|---|---|
| 6,873,982 B1 | 3/2005 | Bates et al. | |
| 7,370,381 B2 * | 5/2008 | Tuttle et al. | 707/748 |
| 7,739,274 B2 * | 6/2010 | Curtis et al. | 707/723 |
| 7,844,590 B1 * | 11/2010 | Zwicky et al. | 707/706 |
| 7,873,641 B2 * | 1/2011 | Frieden et al. | 707/748 |
| 7,912,836 B2 * | 3/2011 | Tuttle et al. | 707/723 |
| 8,082,174 B1 * | 12/2011 | Kamangar et al. | 705/14.1 |
| 2004/0255237 A1 | 12/2004 | Tong | |
| 2006/0004711 A1 | 1/2006 | Naam | |
| 2006/0136378 A1 | 6/2006 | Martin | |
| 2006/0206460 A1 | 9/2006 | Gadkari | |
| 2007/0038620 A1 | 2/2007 | Ka et al. | |
| 2007/0260597 A1 * | 11/2007 | Cramer | 707/5 |
| 2008/0114751 A1 * | 5/2008 | Cramer et al. | 707/5 |
| 2009/0248669 A1 * | 10/2009 | Shetti et al. | 707/5 |

FOREIGN PATENT DOCUMENTS

WO WO2006/057518 A1 6/2006

OTHER PUBLICATIONS

Kim et al.; Wordnet-Based Collaborative Weighting for Ranking Web Pages; Proceedings of the IASTED International Conference Artificial and Computational Intelligence; Sep. 25-27, 2002, Tokyo, Japan; pp. 238-242.

Kim et al.; Improving Performance of Web Search Using the User Preference in Query Word Senses; Journal of KISS: Software and Applications Aug. 31, 2004; pp. 1101-1112.

* cited by examiner

*Primary Examiner* — Tony Mahmoudi  
*Assistant Examiner* — Mark Lee  
(74) *Attorney, Agent, or Firm* — Schmeiser, Olsen & Watts; John Pivnichny (57) ABSTRACT

A ranking method and system. The method includes receiving by a computing system, from a user, a keyword associated with a search for information. The computing system generates a results list comprising links to files comprising data associated with the keyword. The computing system generates and displays a first ranked results list comprising the links in a first ranked order. The computing system receives from the first user, a selection for a first link of the links. The computing system determines that the first link comprises relevant information associated with the keyword. The computing system generates a second ranked results list. The second ranked results list comprises the links in a second ranked order differing from the first ranked order. The first link is listed as a first selection on the second ranked results list. The computing system stores the second ranked results list.

13 Claims, 5 Drawing Sheets

SEARCH RESULTS RANKING METHOD AND SYSTEM

FIELD OF THE INVENTION

The present invention relates to a method and associated system for ranking results associated with a search for information.

BACKGROUND OF THE INVENTION

Locating specific information typically comprises an inaccurate process with little flexibility. Accordingly, there exists a need in the art to overcome at least some of the deficiencies and limitations described herein above.

SUMMARY OF THE INVENTION

The present invention provides a method comprising:

receiving, by a computing system from a first user during a first time period, a first keyword associated with a search for information;

generating, by said computing system, a results list comprising links to files comprising data associated with said keyword, wherein each link of said links is associated with a file of said files, and wherein each said file comprises an associated portion of said data;

generating, by said computing system from said results list, a first ranked results list, wherein said first ranked results list comprises said links in a first ranked order;

displaying, by said computing system for said user, said first ranked results list;

receiving, by said computing system from said first user, a first selection for a first link of said links;

determining, by said computing system, that said first link comprises relevant information associated with said keyword;

generating, by said computing system from said links, a second ranked results list, wherein said second ranked results list comprises said links in a second ranked order differing from said first ranked order, wherein said generating said second ranked results list is based on said first selection, and wherein said first link is listed as a first selection on said second ranked results list; and storing, by said computing system, said second ranked results list.

The present invention provides a computing system comprising a processor coupled to a computer-readable memory unit, said memory unit comprising instructions that when executed by the processor implements a ranking method, said method comprising:

receiving, by said computing system from a first user during a first time period, a first keyword associated with a search for information;

generating, by said computing system, a results list comprising links to files comprising data associated with said keyword, wherein each link of said links is associated with a file of said files, and wherein each said file comprises an associated portion of said data;

generating, by said computing system from said results list, a first ranked results list, wherein said first ranked results list comprises said links in a first ranked order;

displaying, by said computing system for said user, said first ranked results list;

receiving, by said computing system from said first user, a first selection for a first link of said links;

determining, by said computing system, that said first link comprises relevant information associated with said keyword;

generating, by said computing system from said links, a second ranked results list, wherein said second ranked results list comprises said links in a second ranked order differing from said first ranked order, wherein said generating said second ranked results list is based on said first selection, and wherein said first link is listed as a first selection on said second ranked results list; and storing, by said computing system, said second ranked results list.

The present invention advantageously provides a simple method and associated system capable of locating specific information.

DETAILED DESCRIPTION OF THE INVENTION

Figure 1:
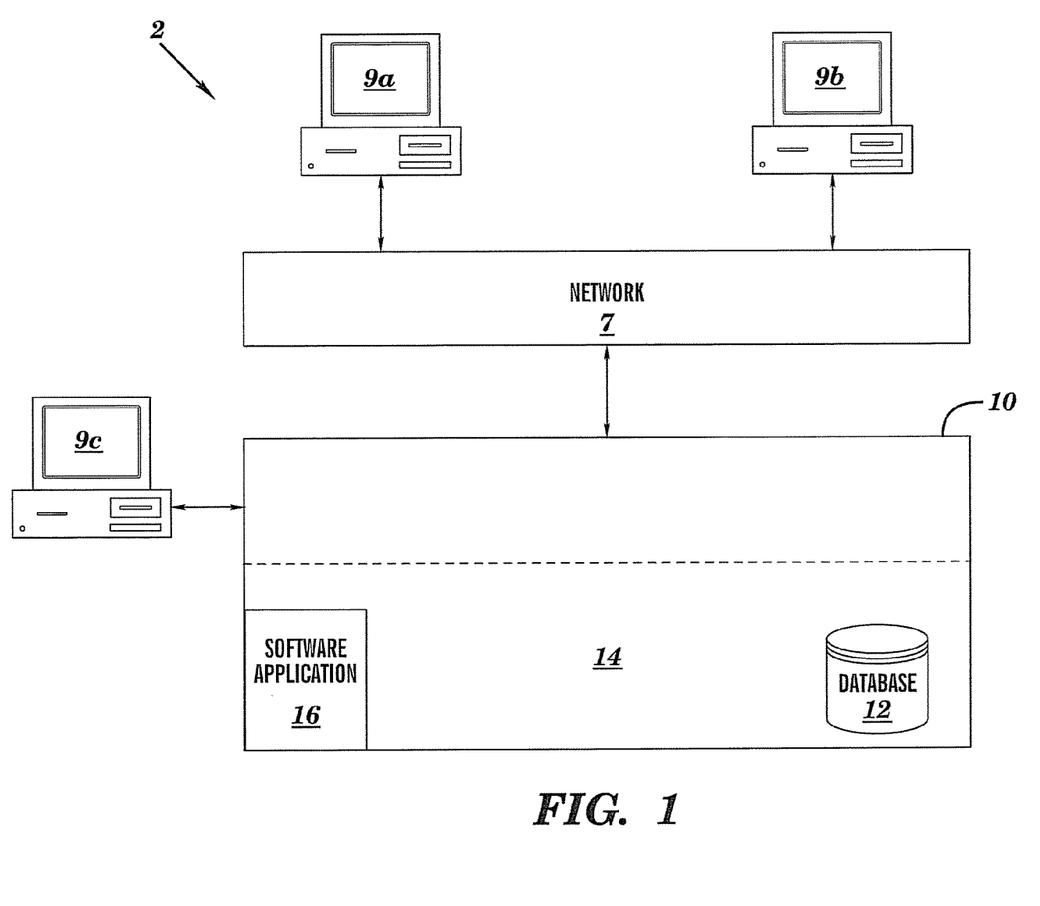
FIG. 1 illustrates a system for ranking search results, in accordance with embodiments of the present invention.

FIG. 1 illustrates a system 2 for ranking search results, in accordance with embodiments of the present invention. System performs a method (i.e., a silent tagging process) for monitoring keywords used in user searches for information and associating the keywords with pages or files comprising relevant information in order to increase relevance in subsequent searches.

System 2 of FIG. 1 comprises a computing apparatus 9a and a computing apparatus 9b, connected to a computing system 10 through a network 7. Computing apparatus 9a and computing apparatus 9b are used by users for performing searches for information in computing system 10. Network 7 may comprise any type of network including, inter alia, a local area network, (LAN), a wide area network (WAN), the Internet, an Intranet, etc. Network 7 may comprise a wireless network. Computing system 10 may comprise any type of computing system(s) including, inter alia, a personal computer (PC), a server computer, a database computer, etc. Computing system 10 may comprise a single computing system or a plurality of computing systems. Computing system 10 comprises a memory system 14 (e.g., a database). Memory system 14 may comprise a single memory system. Alternatively, memory system 14 may comprise a plurality of memory systems. Memory system 14 may be internal to computing system (e.g., as illustrated in FIG. 1) or external to computing system 10. Memory system 14 comprises a software application 16 and a database 12. System 2 may comprise an optional computing apparatus 9c connected to computing system 10. Computing apparatus 9c may be used by an administrator for entering data in database 12. Database 12 comprises ranked lists associated with information, silent tagging tables, etc. Computing apparatus 9a . . . 9c may comprise any type of computing system(s) including, inter alia, a personal computer (PC), a server computer, a database computer, a computer terminal, a notebook computer, etc.

System 2 enables a silent tagging process for enhancing a relevance of search results (i.e., for information) in an enterprise environment. The silent tagging process comprises collecting social data implicit in search keywords entered by users in a search input box. The search keywords are automatically associated with pages (comprising information) or files based on user responses to search results (e.g., clicked links). The silent tagging process will return relevant search results by evaluating social data. The silent tagging process capitalizes on a frequency of a search action. For example, employees in an enterprise frequently perform searches for content therefore, the more the employees search for the content, the more relevant the search results will become. The silent tagging process gathers social data through a background operation that users will not notice. The silent tagging process comprises a method for collecting social data from search keywords and associating the social data with content based on user responses. Many different types of user responses could be used to create the associations. For example, user clicks of search results (i.e., links). In this scenario, a page (i.e., associated with a click of the search result) is valued because it is selected above all other search results. Alternatively, complex measures involve measuring page dwell time or nested clicks may be incorporated into the silent tagging process. The following implementation example illustrates a silent tagging process:

Table 1 illustrates a simple Website comprising three pages and letters for content.

TABLE 1

| Page | Content |
|------|---------|
| 1 | a, b, c |
| 2 | b, c, d |
| 3 | c, d, e |

In order to demonstrate an effect of a silent tagging process, the sample website is represented in Table 1. The sample website comprises three pages. Instead of text and images, the sample Website comprises letters for content. For example, page 1 comprises the letters "a", "b" and "c" for content.

Table 2 illustrates simple content index maps connecting content to Website pages.

TABLE 2

| Content | Pages |
|---------|-------|
| a | 1 |
| b | 2, 1 |
| c | 3, 2, 1 |
| d | 3, 2 |
| e | 3 |

Table 2 presents an index for the content in Table 1. For example, content "b" may be found on pages one and two. A search engine comprises specific ranking rules. In this case, page two is ranked first and page one is ranked second. Without the silent tagging process, subsequent searches for content "b" would always yield the same results.

Table 3 comprises silent tagging associations.

TABLE 3

| | Keyword | | | | |
|---|---|---|---|---|---|
| Page | a | b | c | d | e |
| 1 | 1 | 4 | 1 | 1 | 1 |
| 2 | 1 | 1 | 1 | 1 | 1 |
| 3 | 1 | 1 | 1 | 1 | 1 |

The silent tagging process stores associations between search keywords and results clicked (or accessed) by users. The association is stored in a table (i.e., table 3) as weights representing a relative likelihood that a given page will turn up for a particular keyword. The weights are adjusted by system 2 as it learns the preferences of it users. There are a variety of weighting methods than may be used with the silent tagging process. For this example, the weights may be represented as frequency counts (i.e., a number of times a page has been selected by a user for a given keyword). At initialization, no learning has occurred. Therefore all counts are equal. Although a value of one is used in table 3, note that any non-zero number may be used. After some searches have been performed, the counts are modified. In the example illustrated in table 3, searchers using keyword "b" clicked page one three times for a total count of four. Therefore, a relevance of page one to keyword "b" has increased.

Table 4 illustrates a silent tagging re-ranking algorithm for a keyword "b".

TABLE 4

| Page | Original Content Ranking | Relative Association Strengths | Re-ranking Factor | Adjusted Ranking |
|------|---|---|---|---|
| 1 | 2 | 4/6 | 1 − 4/6 = 2/6 | 2 * 2/6 = 4/6 (rank = 1) |
| 2 | 1 | 1/6 | 1 − 1/6 = 5/6 | 1 * 5/6 = 5/6 (rank = 2) |

During a silent tagging process, subsequent searches for keyword "b" may comprise different results based on user clicks. Table 4 lists the pages and original rankings for a search for keyword "b". The silent tagging process performs the following steps:
1. The silent tagging process queries associations table (i.e., table 3) for an association for each page.
2. The silent tagging process calculates relative association strengths by dividing an association value for a given page/keyword by a sum of association values for all pages in a given keyword column.
3. The silent tagging process calculates a re-ranking factor. Any search ranking algorithm places results in ascending order with a rank of one for the most relevant result, a rank of two for a next most relevant result, etc. The values calculated in step 2 should also be in ascending order. Higher value associations should cause page ranks to decrease toward the first rank of one. A simple method for calculating a re-ranking factor is to subtract a relative strength fraction from a value of one.
4. The silent tagging process applies the re-ranking factor. For each page, the original content ranking is multiplied by the re-ranking factor thereby yielding an adjusted set of rankings. Unlike the rankings provided by Table 2, the silent tagging process has re-ranked the results so that page one has now ascended to the first rank and page two has descended to the second rank. Therefore a search tool learns from the responses of previous users to benefit subsequent users searching with similar keywords. Note that while some users may make bad clicks others users will correct those mistakes. The overall effect is that the search results are being adjusted to reflect the interests of an enterprise community of searchers.

Figure 2:
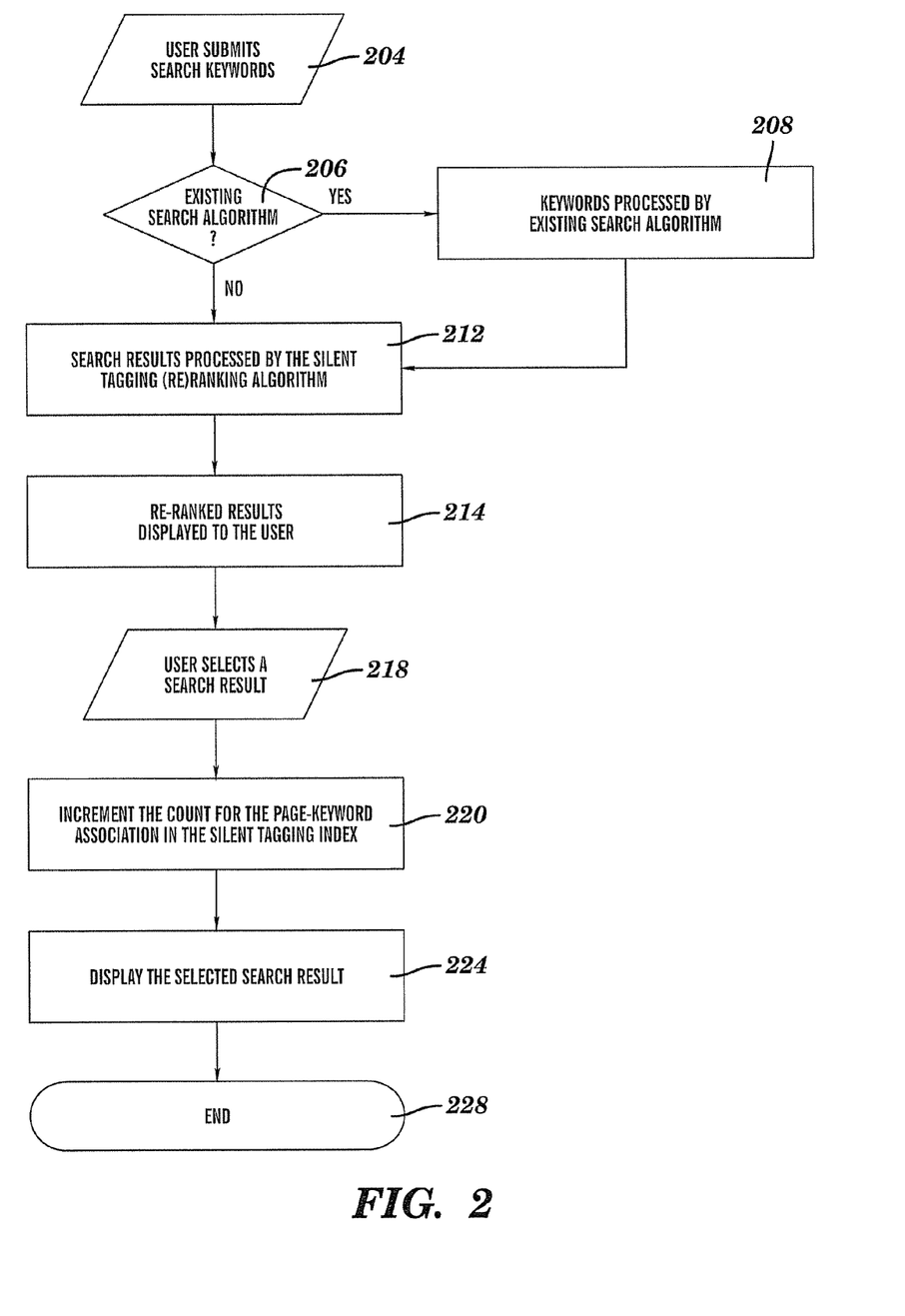
FIG. 2 illustrates a flowchart describing an algorithm used by the system of FIG. 1 for ranking search results, in accordance with embodiments of the present invention.

FIG. 2 illustrates a flowchart describing an algorithm used by system 2 of FIG. 1 for ranking search results, in accordance with embodiments of the present invention. In step 202, a user submits a search keyword(s). One or more keywords are entered by a user into a data input element such as, inter alia, a textbox on a webpage. The keywords are submitted when the user clicks a submit button. In step 206, it is determined if an existing search algorithm will be executed. If in step 206, it is determined that an existing search algorithm will be executed then in step 208, the keyword(s) entered in step 204 is first processed by the existing search algorithm (i.e., to generate first search results) and then in step 212, the search results determined in step 208 are processed by a tagging re-ranking algorithm (i.e., as described in detail with reference to FIG. 4). If in step 206, it is determined that an existing search algorithm will not be executed then in step 212, the keyword(s) entered in step 204 is exclusively processed by a tagging re-ranking algorithm (i.e., as described in detail with reference to FIG. 4) to generate re-ranked results. The tagging re-ranking algorithm captures user search behavior to increase a relevance of search results in subsequent searches. Steps 218 and 220 as described, infra, illustrate a capture of user search behavior. In step 214, the re-ranked results from step 212 are displayed to the user. The results are displayed to user in ascending order of a new rank calculated in step 212. The results are displayed may include some data for the user to evaluate the search results before making a selection (e.g., a display of a first few lines of content). The search results may additionally work with other displays that allow the user to evaluate the results (e.g., summary statistics). In step 218, the user selects a search result. The user examines the list of search results and selects a result for further examination (e.g., by clicking the title of one result from a web page). The selection behavior is regarded as an evaluation by the user that the selected page has a stronger relevance association with the keyword(s) than pages not selected. In step 220, a count is incremented for the page-keyword association in a silent tagging index. For each keyword entered by the user, the page association in the silent tagging table (i.e., table 3 as described with reference to FIG. 1) is incremented by one. Note that incrementing by one is may not be sufficient to affect the original rankings of an existing search algorithm. In the example illustrated in table 3, the count had to be incremented to four to make a difference. The aggregate effect stored in table 3 represents relevance in accordance with an overall community of searchers. In step 224, the selected search results are displayed in detail. The user views the full contents of the selected search result and the process is terminated in step 228.

Figure 3:
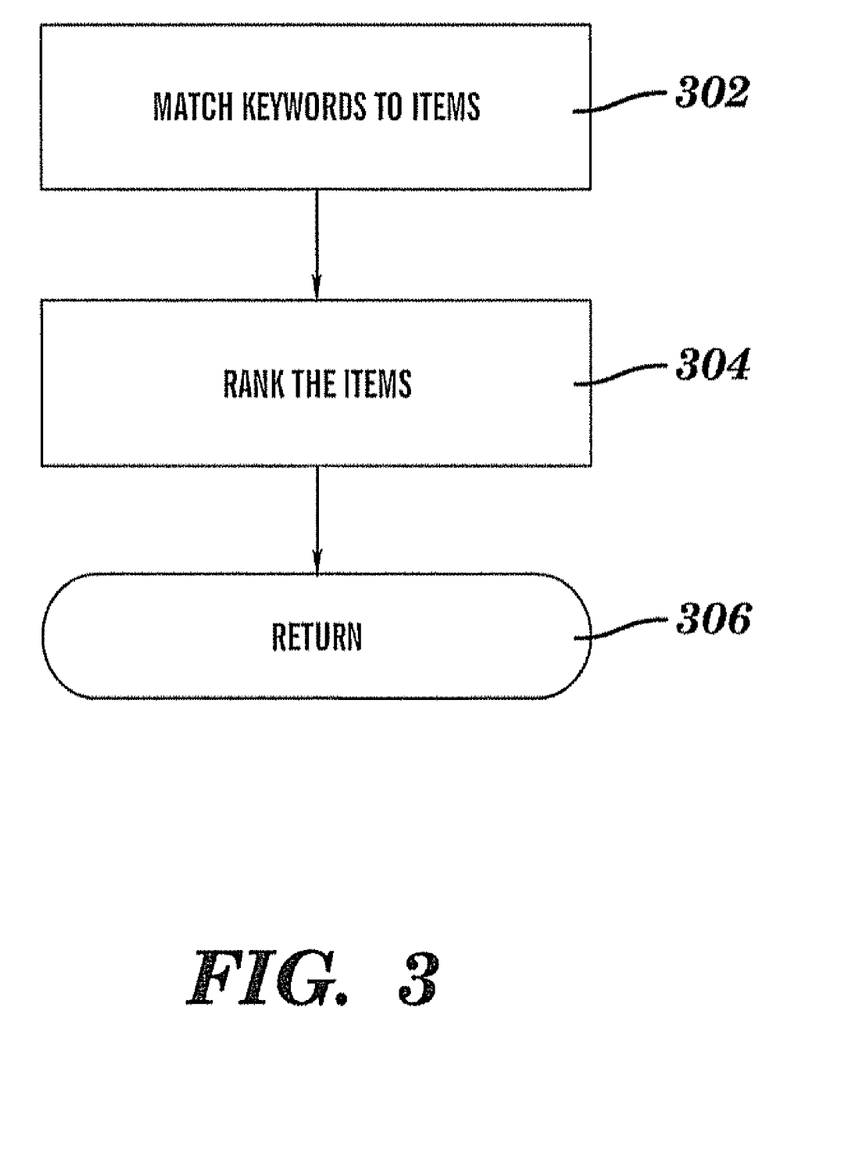
FIG. 3 illustrates a detailed description of a first step in the algorithm of FIG. 2, in accordance with embodiments of the present invention.

FIG. 3 illustrates a detailed description of step 208 in the algorithm of FIG. 2, in accordance with embodiments of the present invention. In step 302, entered keywords are matched to items. A search algorithm matches keywords to content in an index. Table 2 as described with reference to FIG. 1 illustrates a simple index that maps Website content from table 1 (i.e., as described with reference to FIG. 1) to their associated pages. If a user enters a search keyword, "b", for example, the algorithm would return pages one and two. If multiple keywords were used, more sophisticated rules matching rules would apply. In step 304, the items are ranked. For example, items may be ranked in the order in which they are listed in the content index. In the current example, the search keyword, "b" would return page two as a top result and page one as the second result. In step 306, the ranked results from step 304 are returned to the algorithm of FIG. 2.

Figure 4:
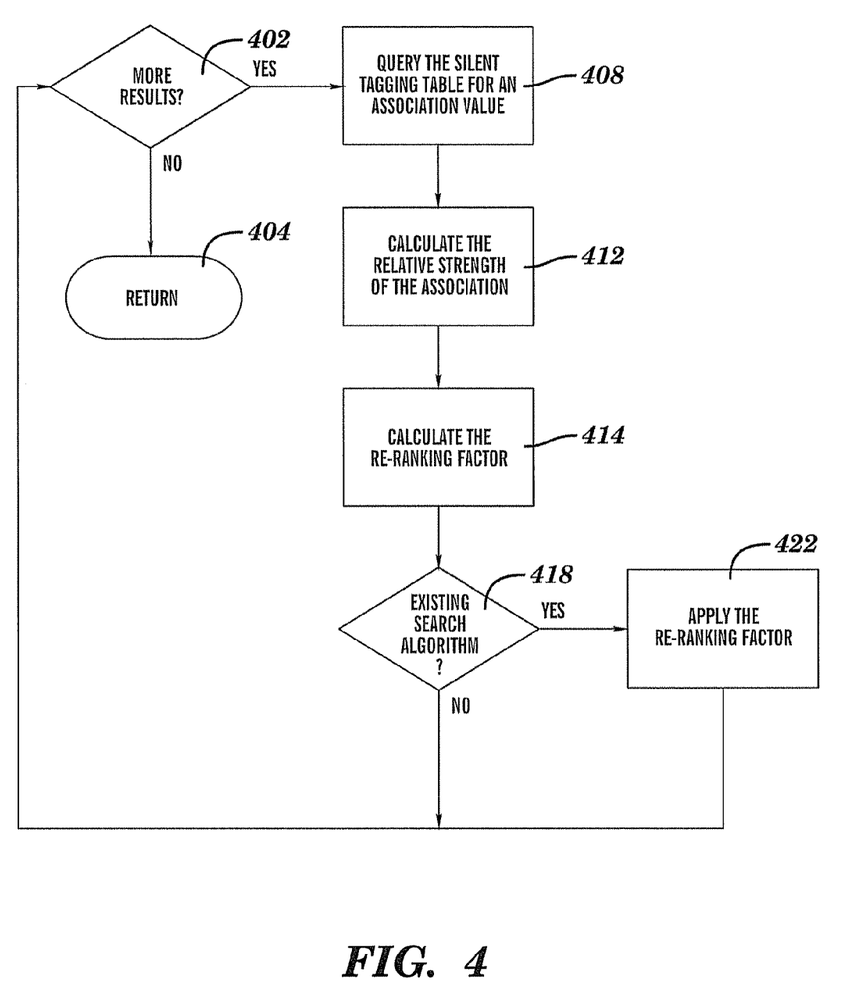
FIG. 4 illustrates a detailed description of a second step in the algorithm of FIG. 2, in accordance with embodiments of the present invention

FIG. 4 illustrates a detailed description of step 212 in the algorithm of FIG. 2, in accordance with embodiments of the present invention. In step 402, it is determined if there are any additional results. For each result or webpage returned, the system will perform steps 408-422 to recalculate its rank. If in step 402, it is determined that there are no additional results then in step 404, all available results are returned to the algorithm of FIG. 2. If in step 402, it is determined that there are additional results then in step 408, a silent tagging table (e.g., table 3 as described with reference to FIG. 1) is queried for an association value. The silent tagging process uses a table to store numeric associations between pages and keywords. Table 3 comprises columns for pages and rows for keywords. Before any searches have been performed, the associations in the table are initialized to the value of one (or any positive integer greater than zero). Table 3 illustrates an example where a keyword "b" and page one have an association value of four as a result of previous user search behavior (i.e., as described with reference to step 220 in FIG. 2). In step 412, a relative strength of the association is calculated. The relative strength of an association is calculated by dividing an association value for a given page/keyword by a sum of association values for all pages in a given keyword column. In step 414, a re-ranking factor is calculated. Any search ranking algorithm places results in ascending order with a rank of one for a most relevant result and two for the next most relevant result, etc. The values calculated in step 412 are in ascending order (i.e., higher value associations should cause page ranks to decrease toward a first rank of one). A method for calculating the re-ranking factor is to subtract a relative strength fraction from a value of one (e.g., see sample calculations in table 4). In step 418, it is determined if there is an existing search algorithm. If in step 418, it is determined that there is not an existing search algorithm then step 402 is repeated. If in step 418, it is determined that there is an existing search algorithm then in step 422, the re-ranking factor is applied to the results and step 402 is repeated.

Figure 5:
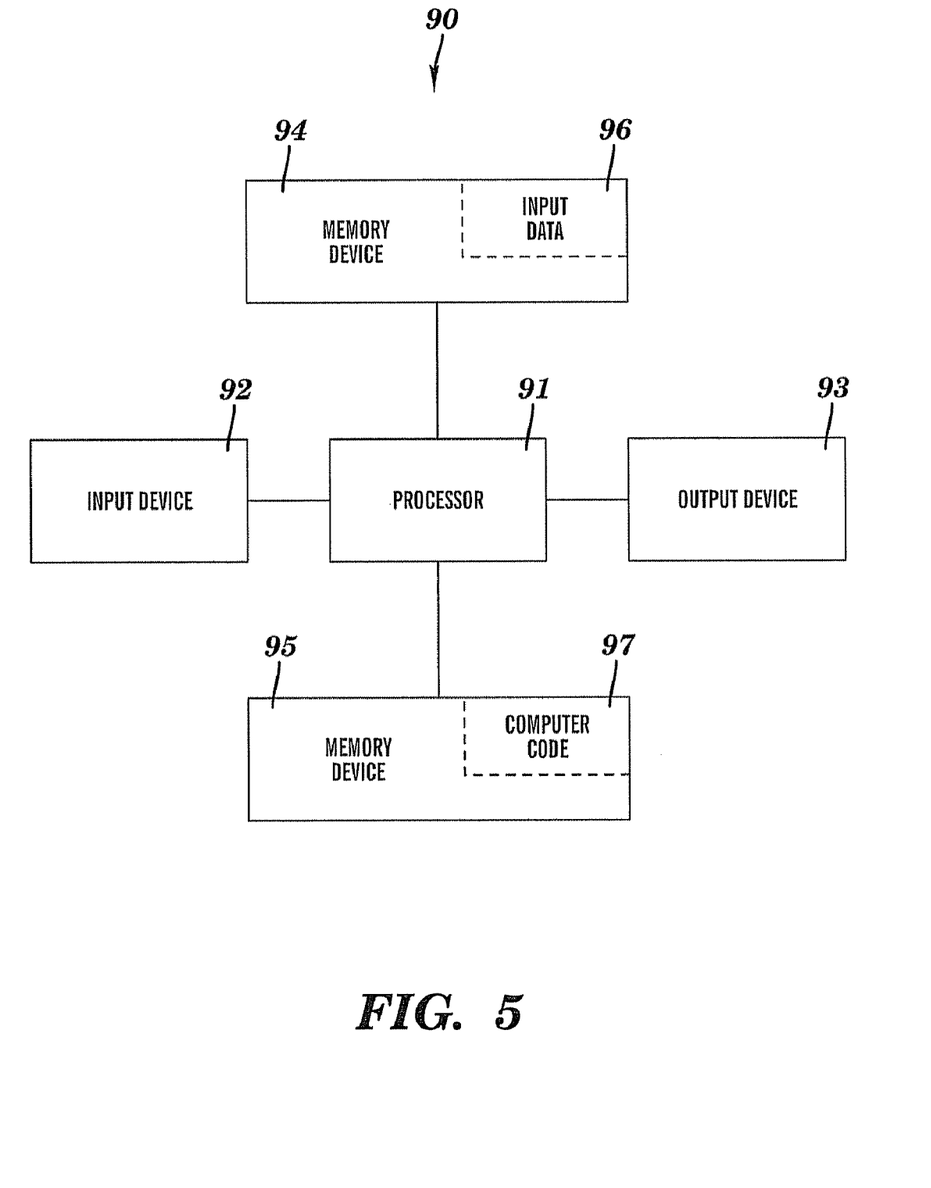
FIG. 5 illustrates a computer apparatus used for ranking search results, in accordance with embodiments of the present invention.

FIG. 5 illustrates a computer apparatus 90 (e.g., computing system 10 of FIG. 1) used for ranking search results, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4) for ranking search results. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2-4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to for rank search results. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for ranking search results. In another embodiment, the invention provides a business method that performs the process steps of the invention on a subscription, advertising, and/or fee basis. That is, a service provider, such as a Solution Integrator, could offer to perform a process for ranking search results. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

receiving, by a computing system from a first user during a first time period, a first keyword associated with a search for information;

generating, by said computing system, a results list comprising links to Webpages comprising files comprising data associated with said first keyword, wherein each link of said links is associated with a file of said files, and wherein each said file comprises an associated portion of said data;

generating, by said computing system, a first table comprising Webpage identification numbers of said Webpages and associated content of said data, wherein said associated content comprises text and images;

generating, by said computing system, a content index mapping table comprising mapping between said Webpage identification numbers and said associated content;

measuring, by said computing system, page dwell times for each Webpage of said Webpages;

measuring, by said computing system, nested clicks associated with said Webpages;

generating, by said computing system based on said page dwell times, said nested clicks, said results list, said first table, and said content index mapping table, a silent tagging table comprising a first ranked results list comprising associations between said links and said first keyword, wherein said first ranked results list comprises said links in a first ranked order, wherein said first ranked results are ranked based on frequency counts comprising a number of times each of said links has been selected for said first keyword, and wherein said silent tagging table comprises said Webpage identification numbers, content identifiers, and associated frequency counts of said frequency counts;

displaying, by said computing system for said first user, said first ranked results list;

receiving, by said computing system from said first user, a first selection for a first link of said links;

determining, by said computing system, that said first link comprises relevant information associated with said keyword;

generating, by said computing system from said links, a silent tagging re-ranking table comprising a second ranked results list, wherein said second ranked results list comprises said links in a second ranked order differing from said first ranked order, wherein said generating said second ranked results list is based on said first selection, wherein said first link is listed as a first selection on said second ranked results list, and wherein said generating said silent tagging re-ranking table comprises:

querying, by said computing system, said silent tagging table for association values associated with each association of said associations;

retrieving, by said computing system from said silent tagging table in response to said querying, said association values;

calculating, by said computing system, a relative strength value for each said association, wherein said calculating said relative strength value for each said association comprises dividing each association value of said association values by a sum of all of said association values;

calculating, by said computing system based on each said relative strength value, re-ranking factors for each said association, wherein said calculating said re-ranking factors comprises subtracting each said relative strength value from a variable value;

applying, by said computing system, said re-ranking factors to said links; and calculating, by said computing system based on said applying, adjusted rankings for said links, wherein said calculating said adjusted rankings comprises multiplying each of said re-ranking factors with original ranking variables associated with said first ranked order, and wherein said silent tagging re-ranking table comprises said original ranking variables, each said relative strength value, said re-ranking factors, said adjusted rankings, calculations for said calculating said re-ranking factors, and calculations for said calculating said adjusted rankings;

storing, by said computing system, said silent tagging re-ranking table comprising said second ranked results list;

displaying, by said computing system for said first user, said second ranked results list;

displaying, by said computing system for said first user, a plurality of lines of content for each result of said second ranked results list;

displaying, by said computing system for said first user, summary statistics associated with each said result of said second ranked results list; and receiving, by said computing system from said first user in response to said displaying said plurality of lines of content and said displaying said summary statistics, evaluation data associated with said second ranked results list.

2. The method of claim 1, further comprising:

receiving, by said computing system from a second user during a second time period, said first keyword, wherein said second time period occurs after said first time period;

displaying, by said computing system for said second user, said second ranked results list;

receiving, by said computing system from said second user, a second selection for a second link of said links;

determining, by said computing system, that said second link comprises relevant information associated with said keyword;

generating, by said computing system from said links, a third ranked results list, wherein said third ranked results list comprises said links in a third ranked order differing from said first ranked order and said second ranked order, wherein said generating said third ranked results list is based on said first selection and said second selection, and wherein said second link is listed as a first selection on said third ranked results list; and storing, by said computing system, said third ranked results list.

3. The method of claim 2, further comprising:

receiving, by said computing system from said first user during a third time period, said first keyword, wherein said third time period occurs after said first time period and said second time period; and displaying, by said computing system for said first user, said third ranked results list.

4. The method of claim 3, further comprising:

receiving, by said computing system from said first user, a third selection for a third link of said links;

determining, by said computing system, that said third link comprises relevant information associated with said keyword;

generating, by said computing system from said links, a fourth ranked results list, wherein said fourth ranked results list comprises said links in a fourth ranked order differing from said first ranked order, said second ranked order, and said third ranked order, wherein said generating said fourth ranked results list is based on said first selection, said second selection, and said third selection, and wherein said third link is listed as a first selection on said fourth ranked results list; and storing, by said computing system, said fourth ranked results list.

5. The method of claim 1, further comprising:

before said generating said results list, generating by said computing system, a pre-results list comprising said links, wherein said pre-results list comprises said links in a first pre-ranked format, wherein said generating said results list comprises re-ranking said links such that said results list comprises said links in a second pre-ranked format differing from said first pre-ranked format.

6. The method of claim 1, further comprising:

receiving, by said computing system from said first user during a second time period, said first keyword, wherein said second time period occurs after said first time period;

displaying, by said computing system for said first user, said second ranked results list;

receiving, by said computing system from said first user, a first group selection for a first group of links of said links, wherein said first group of links does not include all of said links;

determining, by said computing system, that said first group of links comprise relevant information associated with said keyword;

generating, by said computing system from said first group of links, a third ranked results list, wherein said third ranked results list consists of said first group of links in a ranked order, and wherein said generating said third ranked results list is based on said first group selections; and storing, by said computing system, said third ranked results list.

7. A computer program product, comprising a computer storage device storing a computer readable program code, said computer readable program code configured to perform a method upon being executed by a processor of a computing system, said method comprising:

receiving, by said computing system from a first user during a first time period, a first keyword associated with a search for information;

generating, by said computing system, a results list comprising links to Webpages comprising files comprising data associated with said first keyword, wherein each link of said links is associated with a file of said files, and wherein each said file comprises an associated portion of said data;

generating, by said computing system, a first table comprising Webpage identification numbers of said Webpages and associated content of said data, wherein said associated content comprises text and images;

generating, by said computing system, a content index mapping table comprising mapping between said Webpage identification numbers and said associated content;

measuring, by said computing system, page dwell times for each Webpage of said Webpages;

measuring, by said computing system, nested clicks associated with said Webpages;

generating, by said computing system based on said page dwell times, said nested clicks, said results list, said first table, and said content index mapping table, a silent tagging table comprising a first ranked results list comprising associations between said links and said first keyword, wherein said first ranked results list comprises said links in a first ranked order, wherein said first ranked results are ranked based on frequency counts comprising a number of times each of said links has been selected for said first keyword, and wherein said silent tagging table comprises said Webpage identification numbers, content identifiers, and associated frequency counts of said frequency counts;

displaying, by said computing system for said first user, said first ranked results list;

receiving, by said computing system from said first user, a first selection for a first link of said links;

determining, by said computing system, that said first link comprises relevant information associated with said keyword;

generating, by said computing system from said links, a silent tagging re-ranking table comprising a second ranked results list, wherein said second ranked results list comprises said links in a second ranked order differing from said first ranked order, wherein said generating said second ranked results list is based on said first selection, wherein said first link is listed as a first selection on said second ranked results list, and wherein said generating said silent tagging re-ranking table comprises:
  querying, by said computing system, said silent tagging table for association values associated with each association of said associations;
  retrieving, by said computing system from said silent tagging table in response to said querying, said association values;
  calculating, by said computing system, a relative strength value for each said association, wherein said calculating said relative strength value for each said association comprises dividing each association value of said association values by a sum of all of said association values;
  calculating, by said computing system based on each said relative strength value, re-ranking factors for each said association, wherein said calculating said re-ranking factors comprises subtracting each said relative strength value from a variable value;
  applying, by said computing system, said re-ranking factors to said links; and
  calculating, by said computing system based on said applying, adjusted rankings for said links, wherein said calculating said adjusted rankings comprises multiplying each of said re-ranking factors with original ranking variables associated with said first ranked order, and wherein said silent tagging re-ranking table comprises said original ranking variables, each said relative strength value, said re-ranking factors, said adjusted rankings, calculations for said calculating said re-ranking factors, and calculations for said calculating said adjusted rankings;
storing, by said computing system, said silent tagging re-ranking table comprising said second ranked results list;
displaying, by said computing system for said first user, said second ranked results list;
displaying, by said computing system for said first user, a plurality of lines of content for each result of said second ranked results list;
displaying, by said computing system for said first user, summary statistics associated with each said result of said second ranked results list; and
receiving, by said computing system from said first user in response to said displaying said plurality of lines of content and said displaying said summary statistics, evaluation data associated with said second ranked results list.

8. A process for supporting computer infrastructure, said process comprising providing at least one support service for at least one of creating, integrating, hosting, maintaining, and deploying computer-readable code in said computing system, wherein the code in combination with the computing system is capable of performing the method of claim 1.

9. A computing system comprising a processor coupled to a computer-readable memory unit, said memory unit comprising instructions that when executed by the processor implements a ranking method, said method comprising:
  receiving, by said computing system from a first user during a first time period, a first keyword associated with a search for information;
  generating, by said computing system, a results list comprising links to Webpages comprising files comprising data associated with said first keyword, wherein each link of said links is associated with a file of said files, and wherein each said file comprises an associated portion of said data;
  generating, by said computing system, a first table comprising Webpage identification numbers of said Webpages and associated content of said data, wherein said associated content comprises text and images;
  generating, by said computing system, a content index mapping table comprising mapping between said Webpage identification numbers and said associated content;
  measuring, by said computing system, page dwell times for each Webpage of said Webpages;
  measuring, by said computing system, nested clicks associated with said Webpages;
  generating, by said computing system based on said page dwell times, said nested clicks, said results list, said first table, and said content index mapping table, a silent tagging table comprising a first ranked results list comprising associations between said links and said first keyword, wherein said first ranked results list comprises said links in a first ranked order, wherein said first ranked results are ranked based on frequency counts comprising a number of times each of said links has been selected for said first keyword, and wherein said silent tagging table comprises said Webpage identification numbers, content identifiers, and associated frequency counts of said frequency counts;
  displaying, by said computing system for said first user, said first ranked results list;
  receiving, by said computing system from said first user, a first selection for a first link of said links;
  determining, by said computing system, that said first link comprises relevant information associated with said keyword;
  generating, by said computing system from said links, a silent tagging re-ranking table comprising a second ranked results list, wherein said second ranked results list comprises said links in a second ranked order differing from said first ranked order, wherein said generating said second ranked results list is based on said first selection, wherein said first link is listed as a first selection on said second ranked results list, and wherein said generating said silent tagging re-ranking table comprises:
    querying, by said computing system, said silent tagging table for association values associated with each association of said associations;
    retrieving, by said computing system from said silent tagging table in response to said querying, said association values;
    calculating, by said computing system, a relative strength value for each said association, wherein said calculating said relative strength value for each said association comprises dividing each association value of said association values by a sum of all of said association values;
    calculating, by said computing system based on each said relative strength value, re-ranking factors for each said association, wherein said calculating said re-ranking factors comprises subtracting each said relative strength value from a variable value;
    applying, by said computing system, said re-ranking factors to said links; and
    calculating, by said computing system based on said applying, adjusted rankings for said links, wherein said calculating said adjusted rankings comprises multiplying each of said re-ranking factors with original ranking variables associated with said first ranked order, and wherein said silent tagging re-ranking table comprises said original ranking variables, each said relative strength value, said re-ranking factors, said adjusted rankings, calculations for said calculating said re-ranking factors, and calculations for said calculating said adjusted rankings;

storing, by said computing system, said silent tagging re-ranking table comprising said second ranked results list;

displaying, by said computing system for said first user, said second ranked results list;

displaying, by said computing system for said first user, a plurality of lines of content for each result of said second ranked results list;

displaying, by said computing system for said first user, summary statistics associated with each said result of said second ranked results list; and receiving, by said computing system from said first user in response to said displaying said plurality of lines of content and said displaying said summary statistics, evaluation data associated with said second ranked results list.

10. The computing system of claim 9, wherein said method further comprises:

receiving, by said computing system from a second user during a second time period, said first keyword, wherein said second time period occurs after said first time period;

displaying, by said computing system for said second user, said second ranked results list;

receiving, by said computing system from said second user, a second selection for a second link of said links;

determining, by said computing system, that said second link comprises relevant information associated with said keyword;

generating, by said computing system from said links, a third ranked results list, wherein said third ranked results list comprises said links in a third ranked order differing from said first ranked order and said second ranked order, wherein said generating said third ranked results list is based on said first selection and said second selection, and wherein said second link is listed as a first selection on said third ranked results list; and storing, by said computing system, said third ranked results list.

11. The computing system of claim 10, wherein said method further comprises:

receiving, by said computing system from said first user during a third time period, said first keyword, wherein said third time period occurs after said first time period and said second time period; and displaying, by said computing system for said first user, said third ranked results list.

12. The computing system of claim 11, wherein said method further comprises:

receiving, by said computing system from said first user, a third selection for a third link of said links;

determining, by said computing system, that said third link comprises relevant information associated with said keyword;

generating, by said computing system from said links, a fourth ranked results list, wherein said fourth ranked results list comprises said links in a fourth ranked order differing from said first ranked order, said second ranked order, and said third ranked order, wherein said generating said fourth ranked results list is based on said first selection, said second selection, and said third selection, and wherein said third link is listed as a first selection on said fourth ranked results list; and storing, by said computing system, said fourth ranked results list.

13. The computing system of claim 9, wherein said method further comprises:

before said generating said results list, generating by said computing system, a pre-results list comprising said links, wherein said pre-results list comprises said links in a first pre-ranked format, wherein said generating said results list comprises re-ranking said links such that said results list comprises said links in a second pre-ranked format differing from said first pre-ranked format.

* * * * *